United States Patent
Son (10) Patent No.: US 10,352,002 B2
(45) Date of Patent: Jul. 16, 2019

(54) INTEGRATED ASSEMBLY TYPE GRASS PROTECTION MAT AND METHOD OF CONSTRUCTING THE SAME

(71) Applicant: Seo-Young Park, Seongnam-si (KR)

(72) Inventor: Gyeul Son, Jeju-si (KR)

(73) Assignee: Seo-Young Park, Seongnam-si (KR)

( * ) Notice: Subject to any disclaimer, the term of this patent is extended or adjusted under 35 U.S.C. 154(b) by 0 days.

(21) Appl. No.: 15/953,452

(22) Filed: Apr. 15, 2018

(65) Prior Publication Data
US 2018/0305872 A1 Oct. 25, 2018

(30) Foreign Application Priority Data
Apr. 20, 2017 (KR) .......................... 10-2017-0051030

(51) Int. Cl.
| | | |
|---|---|---|
| *E01C 5/00* | (2006.01) | |
| *E01C 9/00* | (2006.01) | |
| *A01G 13/02* | (2006.01) | |
| *E01C 15/00* | (2006.01) | |
| *E01C 19/52* | (2006.01) | |
| *A01G 9/033* | (2018.01) | |

(52) U.S. Cl.
CPC .......... *E01C 9/004* (2013.01); *A01G 13/0268* (2013.01); *E01C 5/005* (2013.01); *E01C 15/00* (2013.01); *E01C 19/52* (2013.01); *A01G 9/033* (2018.02); *E01C 2201/12* (2013.01); *E01C 2201/14* (2013.01); *E01C 2201/16* (2013.01)

(58) Field of Classification Search
CPC . E01C 5/00; E01C 5/005; E01C 9/004; E01C 2201/14

USPC ....................... 404/35, 41; 403/280
See application file for complete search history.

(56) References Cited

U.S. PATENT DOCUMENTS

| | | | | |
|---|---|---|---|---|
| 2,377,211 A | * | 5/1945 | Cocken, Jr. ............. | E04F 15/06 404/40 |
| 4,287,693 A | * | 9/1981 | Collette ............. | A47G 27/0212 52/177 |
| 5,250,340 A | * | 10/1993 | Bohnhoff ................ | E01C 9/004 428/99 |
| 5,364,204 A | * | 11/1994 | MacLeod ............... | A63C 19/12 404/35 |
| 5,443,545 A | * | 8/1995 | Weber ..................... | E01C 9/004 52/653.1 |

(Continued)

FOREIGN PATENT DOCUMENTS

| | | |
|---|---|---|
| JP | 05-023061 | 2/1993 |
| JP | 10-248408 | 9/1998 |

(Continued)

*Primary Examiner* — Gary S Hartmann (57) ABSTRACT

A grass protection mat comprises a body where grass passing spaces are continuously arranged and an outer frame comprising four frames formed in four directions to finish an outer edge of the body, wherein the grass protection mat further comprises at least one hook fastener which horizontally protrudes from a first lateral frame of the outer frame toward a second lateral frame of an outer frame of a neighboring grass protection mat, and wherein the at least one hook fastener is fastened to at least one fastening hole provided in the outer frame of the second grass protection mat adjacent to the first lateral frame and corresponding to the hook fastener of the grass protection mat.

8 Claims, 6 Drawing Sheets

(56) References Cited

U.S. PATENT DOCUMENTS

| | | | | |
|---|---|---|---|---|
| 6,089,784 A * | 7/2000 | Ardern | E01C 9/08 403/375 |
| 6,526,705 B1 * | 3/2003 | MacDonald | E04F 15/02 428/157 |
| 6,802,159 B1 * | 10/2004 | Kotler | E01C 5/20 404/35 |
| 7,114,298 B2 * | 10/2006 | Kotler | E01C 5/20 52/177 |
| 7,210,876 B2 * | 5/2007 | Moralez | E01C 9/004 404/36 |
| 7,748,177 B2 * | 7/2010 | Jenkins | E01C 5/20 15/215 |
| 7,950,191 B2 * | 5/2011 | Brouwers | E01C 5/20 15/161 |
| 8,070,382 B2 * | 12/2011 | Prinz | E01C 5/18 404/35 |
| 8,128,311 B2 * | 3/2012 | Son | A63C 19/04 403/326 |
| 8,215,077 B1 * | 7/2012 | Dreyer | E04F 15/10 52/177 |
| 8,403,592 B2 | 3/2013 | Son | |
| 8,631,624 B2 * | 1/2014 | McIntosh | E04F 15/02044 52/177 |
| 8,806,831 B1 * | 8/2014 | Dreyer | E04F 15/02038 52/177 |
| 8,827,590 B2 * | 9/2014 | Sawyer | E01C 3/006 404/28 |
| 9,051,739 B2 * | 6/2015 | Rosan | E01C 9/086 |
| 9,243,655 B2 * | 1/2016 | Morris | F16B 17/00 |
| 10,060,083 B2 * | 8/2018 | White, Jr. | E01C 17/00 |
| 2009/0297267 A1 * | 12/2009 | Glynn | E01C 5/18 404/41 |
| 2010/0024293 A1 * | 2/2010 | Son | E01C 9/004 47/20.1 |
| 2014/0298638 A1 * | 10/2014 | Colombo | B23P 19/04 29/525.01 |
| 2017/0328015 A1 * | 11/2017 | Barth | E01C 3/006 |

FOREIGN PATENT DOCUMENTS

| | | |
|---|---|---|
| JP | 3619945 | 11/2004 |
| KR | 10-1769737 | 8/2017 |

* cited by examiner

INTEGRATED ASSEMBLY TYPE GRASS PROTECTION MAT AND METHOD OF CONSTRUCTING THE SAME

RELATED APPLICATION

This application claims the benefit of priority of Korean Patent Application No. 10-2017-0051030, filed on Apr. 20, 2017, the contents of which are incorporated herein by reference in their entirety.

FIELD AND BACKGROUND OF THE INVENTION

The present disclosure relates to an integrated assembly type grass protection mat and a method of constructing the same, and more particularly to an integrated assembly type grass protection mat by which convenience in replacement, construction and control by a user are improved, and a method of constructing the same.

In a growth area for grass, such as a golf course, a lawn, grassplot in a park, etc., the grass is continuously trampled down and damaged by people, vehicles and the like, and therefore renovation of grass is a considerable expense.

Accordingly, a grass protection mat has been constructed in the growth area for grass to prevent the grass from being damaged and buffer a load even though it is continuously trampled down by people, vehicles and the like.

A conventional grass protection mat has been published in Korean Patent No. 10-0898546. The Korean Patent No. 10-0898546 discloses a grass protection mat which is easy to connect neighboring mats and is prevented from subsidence due to a load. This grass protection mat basically includes a body, a rug, a projection pillar, a buffering wing, and an outer frame.

In terms of constructing such a conventional grass protection mat on the ground, a mat coupling tool (for example, a fastening peg member such as an iron pin or the like) is generally provided to couple and fasten the grass protection mat to the ground. The mat coupling tool has a fastening pin structure to be fastened to the ground, and a pillar structure to be stuck in the ground by driving each fastening pin downward from an upper side of the mat.

However, such a fastening pin structure not only needs excessive force for every coupling tool since the coupling tool has to be pressed against or driven into the ground from above, but also has difficulty in construction since it takes long time in the construction.

Further, when it is desired to replace the mat with another mat or move the mat due to a change of season or ground, the constructed mat coupling tool has to be first pulled out and removed. Therefore, it is not easy to separate the mat.

In particular, most of conventional grass protection mats have had a horizontal expansion mat structure in which an edge connection member is used as a hook fastener to continuously couple the mats. However, even in this mat structure, a separate mat coupling tool such as a fastening pin and the like has to be driven into the ground through a connection hole of the edge connection member. Thus, there are difficulties in construction, and it is not easy to assemble and disassemble the mats.

Besides, when external force caused by people's feet or the like is repetitively applied to the mat coupling tool, it may be shaken and gradually pulled out. Therefore, there is a problem that people may fall over a partially protruding coupling tool.

Further, in a structure of connecting the mats through a hook fastener instead of the mat coupling tool, inconvenience in control by a user, for example, causing a user's hand to hurt, involving more cumbersome operations, or the like in using the hook fastener while connecting the mats, has not been improved yet.

SUMMARY OF THE INVENTION

Accordingly, the present disclosure is conceived to solve the foregoing problems, and an aspect of the present disclosure is to provide an integrated assembly type grass protection mat in which a hook fastening means is provided at a lateral side of an outer frame to assemble or disassemble a plurality of grass protection mats instead of using a conventional hook fastening means to be pushed from a top, thereby remarkably shortening time taken in construction, promoting growth of grass by securing a grass passing space as large as possible, and fundamentally improving convenience in control by a user.

In particular, an aspect of the present disclosure is to provide an integrated assembly type grass protection mat in which the grass protection mats are coupled and engaged with each other using a plurality of hook fasteners and a plurality of fastening holes corresponding to the hook fasteners, which are provided in outer frames of the grass protection mat, thereby maintaining high coupling strength between the mats and improving convenience in control by a user since it is possible to couple with or separate from other grass protection mat while minimizing inconvenience in control by a user due to a connector itself.

Further, an aspect of the present disclosure is to provide an integrated assembly type grass protection mat in which a connector placed between neighboring mat units is used as a contraction-expansion compensation means for the mats to thereby increase a contraction-expansion compensation efficiency of the mats, and the connector is formed not to interfere with a space for growing the grass to thereby activate photosynthesis of the grass.

In accordance with an embodiment of the present disclosure, a grass protection mat comprising a body where grass passing spaces are continuously arranged and an outer frame comprising four frames formed in four directions to finish a quadrangular outer edge of the body further comprises at least one hook fastener which horizontally protrudes from a first lateral frame of the outer frame toward a second lateral frame of an outer frame of a neighboring grass protection mat, wherein the at least one hook fastener is fastened to at least one fastening hole which corresponds to the hook fastener of the grass protection mat and is provided in the second lateral frame of the outer frame of the neighboring grass protection mat adjacent to the first lateral frame of the grass protection mat.

The outer frame of the grass protection mat comprises a second lateral frame which faces the first lateral frame of the outer frame of the grass protection mat and is provided with at least one fastening hole to which at least one hook fastener of the neighboring grass protection mat is fastened.

The first lateral frame and the second lateral frame of the grass protection mat may be two frames forming a right angle among the four frames of the quadrangular outer frame of the grass protection mat.

The hook fastener is provided on every frame of the first lateral frame, and the fastening hole may be provided in every frame of the second lateral frame.

The fastening hole may be formed at a position corresponding to a position of the hook fastener.

The hook fastener may comprise a fastening support having a predetermined length to form a predetermined gap to compensate for contraction or expansion between the mats while being fastened to the fastening hole.

The hook fastener or the fastening hole may be formed with an elastic member to facilitate coupling and separation.

The hook fastener may comprise a fastening support horizontally protruding from the first lateral frame of the grass protection mat toward the second lateral frame of the outer frame of the neighboring grass protection mat, and a head formed in one end of the fastening support and inserted into the fastening hole for coupling with the fastening hole.

The head may have a shape of cylinder, arrow or H-shape to facilitate coupling with the fastening hole.

The fastening hole may comprise an outer fastening hole portion having a diameter gradually decreased over a predetermined length section in an inward direction of the second lateral frame; and an inner fastening hole portion being connected with the outer fastening hole portion and having a diameter kept constant after the predetermined length section.

In accordance with another embodiment of the present disclosure, there is provided a method of constructing a grass protection mat comprising a body where grass passing spaces are continuously arranged, and an outer frame comprising four frames formed in four directions to finish a quadrangular outer edge of the body, the method comprising: fastening the grass protection mat which further comprises at least one hook fastener horizontally protruding from a first lateral frame of the outer frame toward a second lateral frame of an outer frame of a neighboring second grass protection mat, into ground; and fastening the at least one hook fastener to at least one fastening hole which corresponds to the hook fastener of the grass protection mat and is provided in the second lateral frame of the outer frame of the neighboring grass protection mat adjacent to the first lateral frame of the grass protection mat.

BRIEF DESCRIPTION OF THE SEVERAL VIEWS OF THE DRAWINGS

The above and/or other aspects of the present disclosure will become apparent and more readily appreciated from the following description of the exemplary embodiments, taken in conjunction with the accompanying drawings in which.

DESCRIPTION OF SPECIFIC EMBODIMENTS OF THE INVENTION

Hereinafter, embodiments of the present disclosure will be described in detail with reference to the accompanying drawings to be easily realized by a person having an ordinary skill in the art to which the present disclosure pertains. However, the present disclosure may be variously implemented and not limited to the embodiments set forth herein. Further, unrelated parts are omitted in the drawings for clear description, and the same elements refer to same numerals throughout the specification.

Below, an attachable and detachable grass protection mat according to one embodiment will be described in detail with reference to the accompanying drawings.

According to the present disclosure, a grass protection mat 120 includes bodies in which grass passing spaces having a shape selected from polygonal shape, for example a hexagonal shape, and circular shapes for basically improving growth or rootage of grass are continuously connected to have a predetermined pattern.

The grass passing space of the body may have various shapes such as a quadrangular, diamond-shaped, triangular, octagonal, circular and the like in accordance with ground characteristics, seasons, environments, etc. In an exemplary embodiment, the grass protection mat is manufactured to have a hexagonal body with the grass passing spaces. However, there are no limits to the shape of the body.

Among structures for continuously connecting the grass passing spaces with one another, such a hexagonal body is advantageous to maximize the area of the grass passing space. In case of the hexagonal body, the area of the grass passing space is greater than that of any other polygonal or circular body, thereby activating photosynthesis in grass.

In other words, the body is manufactured to include the grass passing space having not only the hexagonal shape but also various shapes as long as it is taken into account that a growth space for grass is expanded, the photosynthesis in the grass goes smoothly through the expanded growth space, and the body has no wasteful spaces.

Figure 1:
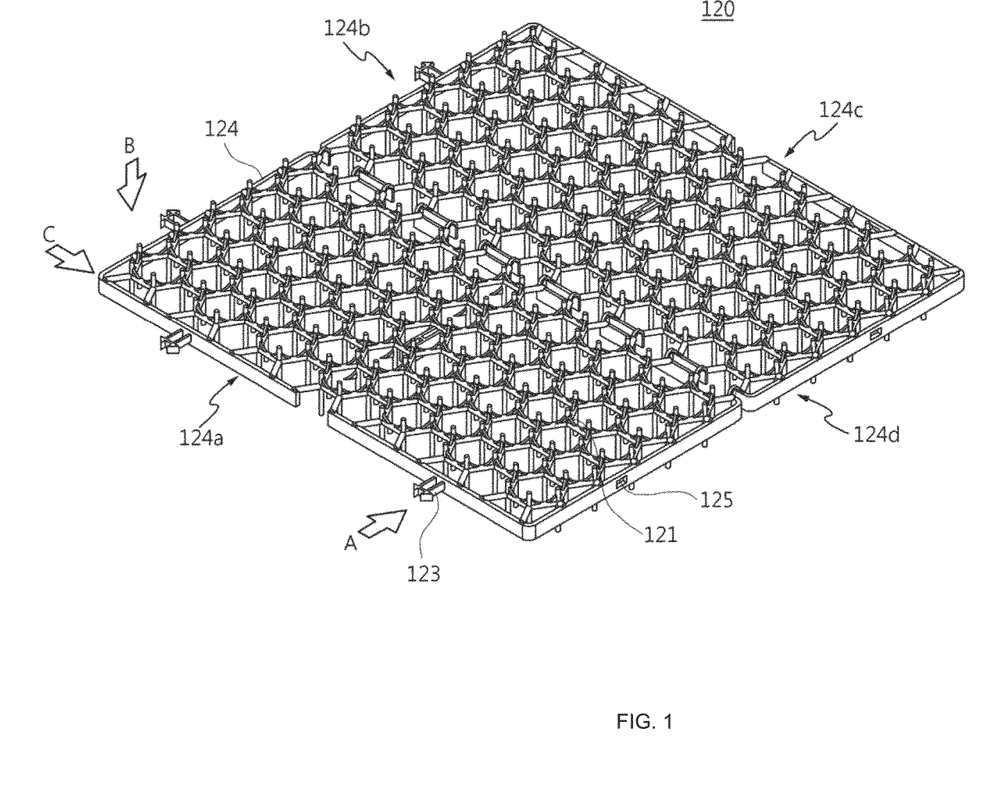
FIG. 1 is a perspective view of a grass protection mat according to one embodiment of the present disclosure.
Figure 2:
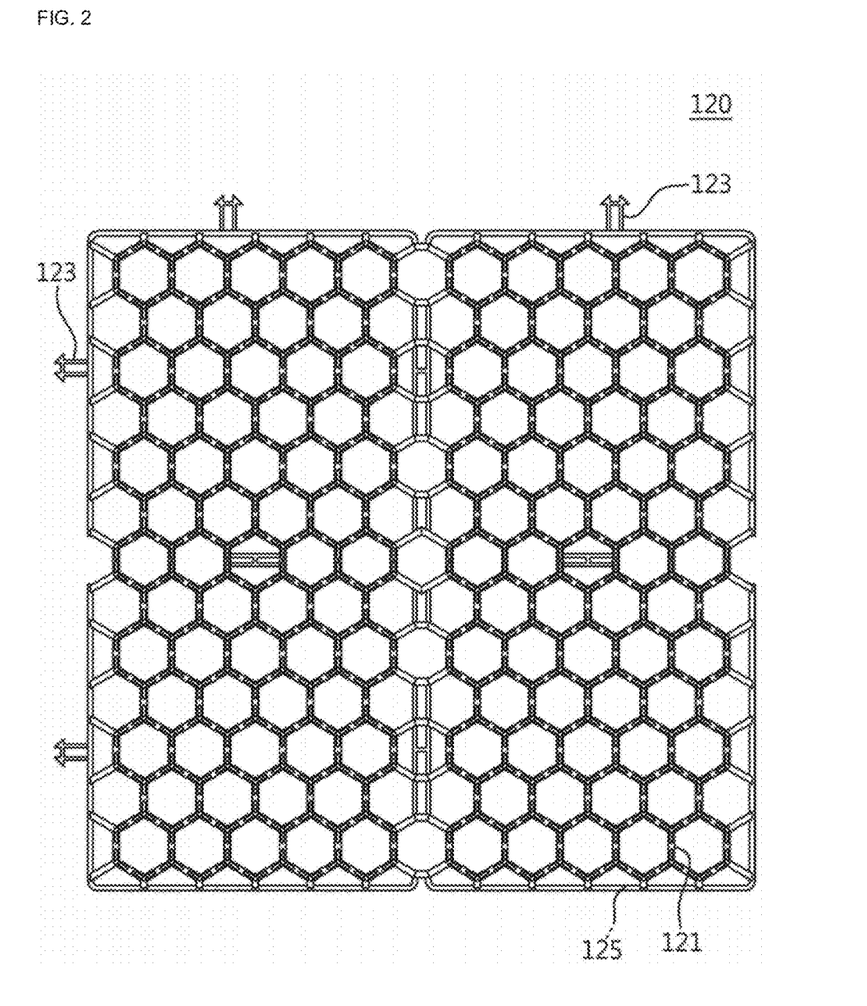
FIG. 2 is a plan view of a grass protection mat according to one embodiment of the present disclosure.

FIG. 1 is a perspective view of a grass protection mat according to one embodiment of the present disclosure, and FIG. 2 is a plan view of the grass protection mat according to one embodiment of the present disclosure. Referring to FIGS. 1 and 2, four mat units constitute an integrated grass protection mat 120.

As shown in FIG. 1, the grass protection mat 120 includes bodies 121, hook fasteners 123, outer frame 124, and fastening holes 125.

The bodies 121 are provided on the ground where grass grows, and forms the grass passing space through which the grass can photosynthesize and grow. The bodies 121 are continuously arranged and integrally connected to thereby constitute an overall frame of the grass protection mat 120.

The body 121 may have a polygonal such as a triangular, octagonal, quadrangular (diamond) shape and the like or circular shape. According to an exemplary embodiment of the present disclosure, the hexagonal shape will be described by way of example among structures for continuously connecting the grass passing spaces.

The outer frame 124 refers to a quadrangular member for finishing the outer edges of four mat units that constitute the grass protection mat 120. That is, as shown in FIGS. 1 and 2, the outer frame 124 is a straight member positioned at an outer quadrangular frame of the mat from view of a plane. Further, the outer frame 124 may include lateral frames 124a, 124b, 124c and 124d in four directions, thereby forming a quadrangular frame.

The hook fastener 123 refers to a member for connecting neighboring grass protection mats 120, and is provided at a specific position on the outer frame 124 forming the outermost edge of the grass protection mat 120. In particular, the hook fastener 123 is provided at a portion on the lateral side of the outer frame 124, for example, a portion on the lateral side from a view of the grass protection mat 120 in a direction of 'A' in FIG. 1. The exemplary drawings illustrate that the hook fastener 123 is positioned in an approximate middle of the lateral side of the outer frame 124. However, the position of the hook fastener 123 may be varied within the lateral side of the outer frame 124, in considering an easiness of coupling with or separating from other mats.

Further, as shown in FIG. 2, the hook fasteners 123 are provided in two outer frames 124 among four outer frames forming the whole outer edge of one unit mat. In particular, the hook fastener 123 is supported in and fastened to first lateral frames 124a and 124b among four frames, thereby easily coupling with other neighboring mats.

Here, the other second lateral frames 124c and 124d among four frames are provided with the fastening holes 125 (to be described hereinafter) to be coupled with the hook fasteners of other grass protection mats.

Further, the hook fasteners 123 horizontally protrude from the first lateral frames 124a and 124b of the grass protection mat toward the second lateral frames 124c and 124d of a neighboring other grass protection mat and are provided as elastic members having certain elasticity to be easily fastened to the fastening holes 125 to be described hereinafter.

Further, the hook fasteners 123 may be formed integrally with the first lateral frames 124a and 124b, or detachably provided on the first lateral frames 124a and 124b.

The fastening hole 125, together with the hook fastener 123, is used for connection between neighboring grass protection mats 120.

The fastening hole 125 is penetrated and fastened by the hook fastener 123, and provided on the lateral sides of the second lateral frames 124c and 124d of the grass protection mat 120.

The fastening holes 125 are provided on the lateral sides of the second lateral frames 124c and 124d. Further, as shown in FIG. 2, the fastening holes 125 are provided in the other two lateral frames, i.e. the second lateral frames 124c and 124d, except the lateral frames for the hook fasteners 123, among four outer frames forming the whole outer edge of one unit mat.

The fastening holes 125 are formed on the second lateral frames 124c and 124d among four frames so as to be easily connected with other neighboring mat.

That is, as shown in the plan view of FIG. 2, the fastening holes 125 may be formed at positions respectively corresponding to those of the hook fasteners 123 of another neighboring mat (i.e. a second grass protection mat). In other words, the second lateral frames 124c and 124d facing the first lateral frames 124a and 124b are formed with the fastening holes to which the hook fasteners of the second grass protection mat are hooked.

Further, the exemplary drawings illustrate that the fastening hole 125 is positioned in the middle of the lateral side of the outer frame 124. However, the position of the fastening hole 125 may be varied within the lateral side of the outer frame 124, in considering an easiness of coupling with or separating from other mats.

Further, the fastening hole 125 is shaped like an insertion hole formed toward the inside of the outer frame 124, and has predetermined elasticity to facilitate coupling with the hook fastener 123.

Figure 3A:
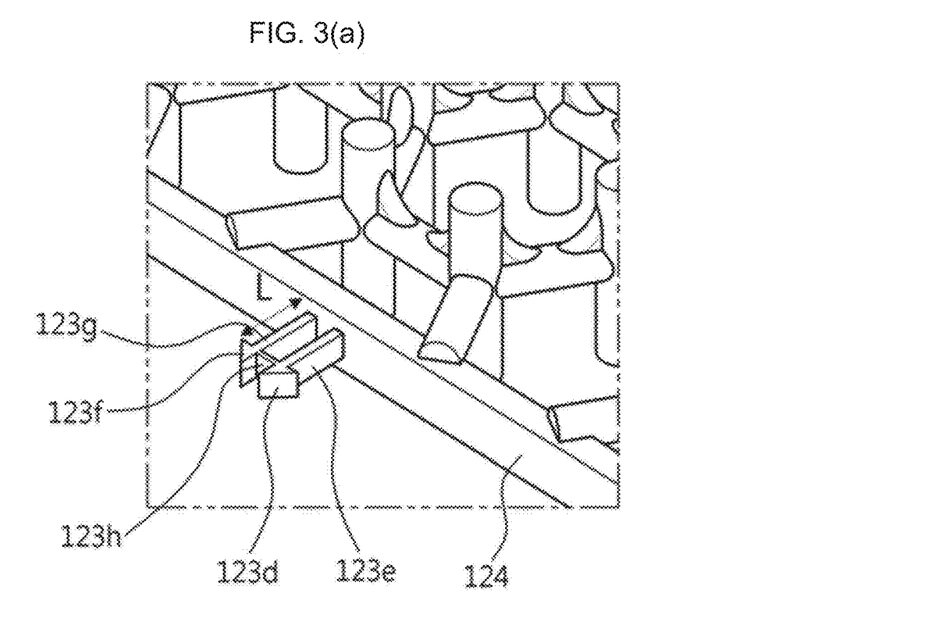
FIGS. 3(a) and 3(b) are enlarged views of a hook fastener according to one embodiment of the present disclosure.
Figure 3B:
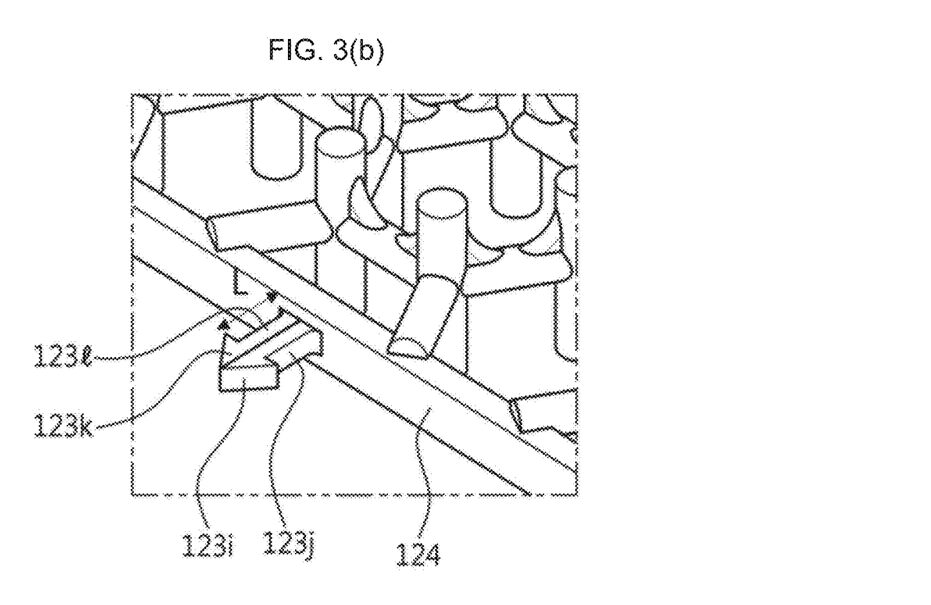

FIGS. 3(a) and 3(b) are enlarged views of a hook fastener according to one embodiment of the present disclosure.

As shown in FIG. 3(a), the hook fastener 123 includes a first head 123d, a first fastening support 123e, a second head 123f, a second fastening support 123g and a connector 123h. As shown in FIG. 3(a), the first head 123d and the second head 123f are shaped like a right triangle, and the connector 123h connects the first head 123d and the second head 123f. The first head 123d, the second head 123f and the connector 123h form a shape of 'H' in a plane view, and are inserted in the fastening hole 125 when the hook fastener 123 and the fastening hole 125 are coupled.

Each of the first fastening support 123e and the second fastening support 123g is a member having a shape of a narrow and long rectangular parallelepiped. The first fastening support 123e and the second fastening support 123g protrude from the outer frame 124 and support the first head 123d and the second head 123f, respectively. As shown in FIG. 3(a), the first fastening support 123e and the second fastening support 123g have one ends respectively connected to the first head 123d and the second head 123f, and the other ends connected to the outer frame 124. Further, the first fastening support 123e and the second fastening support 123g are formed to have a predetermined length, for example, a length of 'L' as shown in FIG. 3(a). The length L has to be matched with the gap between the mat units shown in FIG. 2. In accordance with the length, a predetermined gap may be formed to compensate for contraction or expansion between the mats when the hook fastener 123 is hooked to the fastening hole 125.

Further, the first fastening support 123e and the second fastening support 123g are formed have a predetermined thickness without interfering with the grass passing space while maintaining coupling between the hook fastener 123 and the fastening hole 125. Each thickness of the first fastening support 123e and the second fastening support 123g (i.e. the length of the long side in the rectangular cross-section of the rectangular parallelepiped) is smaller than the thickness of the outer frame 124 as shown in FIG. 3(a).

Further, as shown in FIG. 3(b), the hook fastener 123 includes a first head 123i, a first fastening support 123j, a second head 123k, and a second fastening support 123l. As shown in FIG. 3(b), the first head 123i and the second head 123k have a right triangular shape. The first head 123i and the second head 123k are approximately shaped like a head of an arrow on a plane, and inserted in the fastening hole 125 when the hook fastener 123 and the fastening hole 125 are coupled.

Each of the first fastening support 123j and the second fastening support 123l has a shape of a narrow and long rectangular parallelepiped. The first fastening support 123j and the second fastening support 123l protrude from the outer frame 124 and support the first head 123i and the second head 123k, respectively. As shown in FIG. 3(b), the first fastening support 123j and the second fastening support 123l have one ends respectively connected to the first head 123i and the second head 123k, and the other ends connected to the outer frame 124. Further, the first fastening support 123j and the second fastening support 123l are formed to have a predetermined length, for example, a length of 'L' as shown in FIG. 3(b). The length L may be greater than the gap between the mat units shown in FIG. 2. The length may be given for forming a predetermined gap to compensate for the contraction or the expansion between the mats when the hook fastener 123 and the fastening hole 125 are coupled.

Further, the first fastening support 123j and the second fastening support 123l have a predetermined thickness not to interfere with the grass passing space while maintaining coupling between the hook fastener 123 and the fastening hole 125. Each thickness of the first fastening support 123j and the second fastening support 123*l* (i.e. the length of the long side in the rectangular cross-section of the rectangular parallelepiped) is smaller than the thickness of the outer frame 124 as shown in FIG. 3(*b*).

Figure 4A:
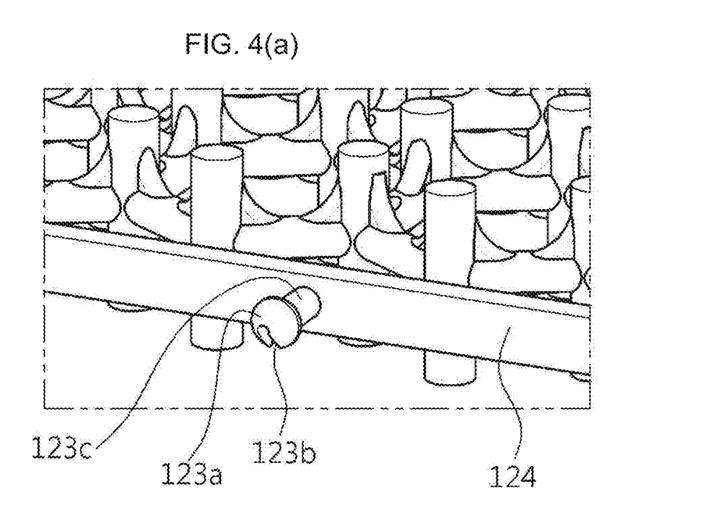
FIG. 4(a) is an enlarged view of a hook fastener according to another embodiment of the present disclosure.
Figure 4B:
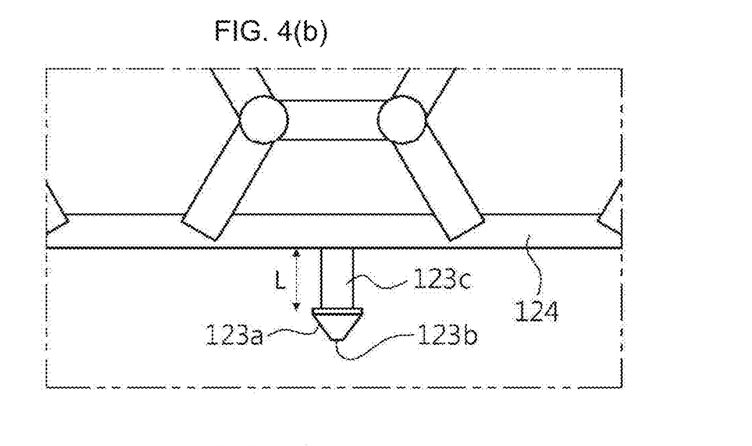
FIG. 4(b) is a plane view of the hook fastener shown in FIG. 4(a), viewed in a direction of 'B' in FIG. 1.
Figure 4C:
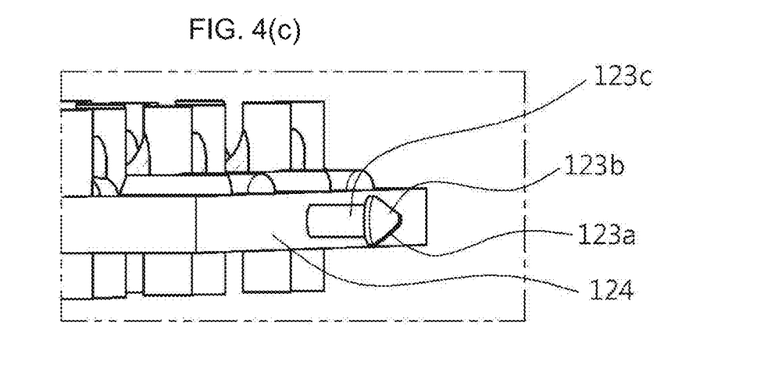
FIG. 4(c) is a lateral cross-section view of the hook fastener shown in FIG. 4(a), viewed in a direction of 'C' in FIG. 1.

FIG. 4(*a*) is an enlarged view of a hook fastener according to another embodiment of the present disclosure, FIG. 4(*b*) is a plane view of the hook fastener shown in FIG. 4(*a*), viewed in a direction of 'B' in FIG. 1, and FIG. 4(*c*) is a lateral cross-section view of the hook fastener shown in FIG. 4(*a*), viewed in a direction of 'C' in FIG. 1.

As shown in FIG. 4(*a*), the hook fastener 123 includes a head 123*a*, an insertion groove 123*b* and a fastening support 123*c*. The head 123*a* is shaped like a cone, and inserted in the fastening hole 125 when the hook fastener 123 and the fastening hole 125 are coupled.

The insertion groove 123*b* is shaped like a predetermined groove formed on the head 123*a*. As shown in FIG. 4(*a*), the insertion groove 123*b* is extended downward from the center of the head 123*a* when it is viewed from the front, and is shaped like a key groove. Besides the shape shown in FIG. 4(*a*), the insertion groove 123*b* may have various insertion groove structures such as a linear insertion groove or the like.

Further, the head 123*a* may not include the insertion groove 123*b* on the top thereof.

The fastening support 123*c* has a shape of a cylinder and protrudes from the outer frame 124, thereby supporting the head 123*a*. As shown in FIG. 4(*a*), the fastening support 123*c* has one end connected to the head 123*a* and the other end connected to the outer frame 124. Further, the fastening support 123*c* is formed to have a predetermined length, for example, a length of 'L' shown in FIG. 4(*b*). The length L has to be longer than the gap between the mat units shown in FIG. 2. The length may be given for forming a predetermined gap to compensate for the contraction or the expansion between the mats when the hook fastener 123 and the fastening hole 125 are coupled.

Further, the fastening support 123*c* has a predetermined thickness not to interfere with the grass passing space while maintaining coupling between the hook fastener 123 and the fastening hole 125. The thickness of the fastening support 123*c* (i.e. the diameter of the circular cross-section in the cylinder) is smaller than the thickness of the outer frame 124 as shown in FIGS. 4(*a*) and 4(*c*).

Figure 5A:
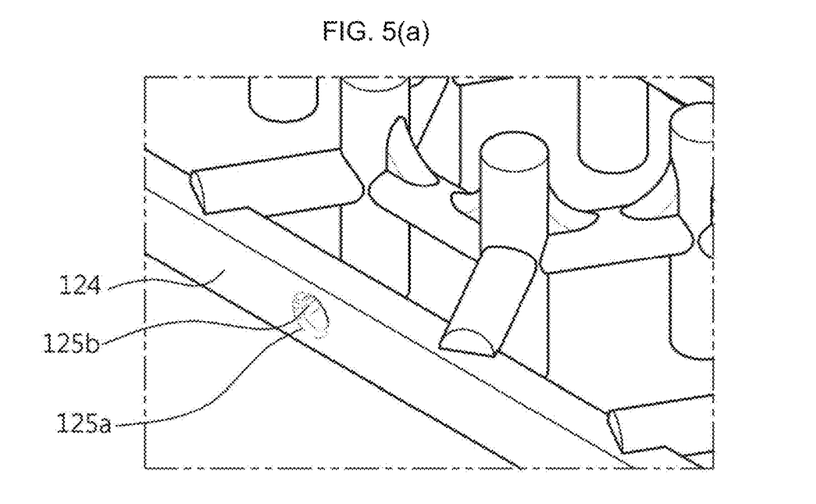
FIGS. 5(a) and 5(b) are enlarged views of a fastening hole according to the present disclosure.
Figure 5B:
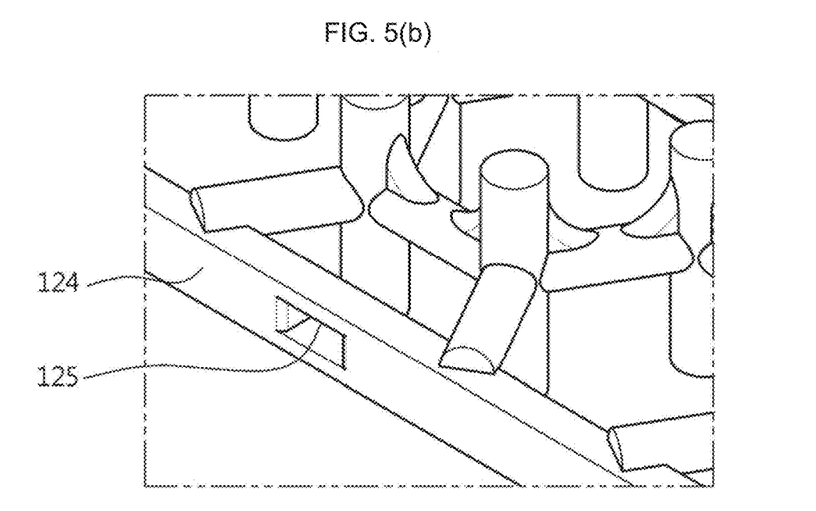

FIGS. 5(*a*) and 5(*b*) are enlarged views of the fastening hole 125 according to an embodiment of the present disclosure.

As shown in FIG. 5(*a*), the fastening hole 125 includes an outer fastening hole portion 125*a* and an inner fastening hole portion 125*b*. As shown in FIG. 5(*a*), the outer fastening hole portion 125*a* is provided in an outer portion of the outer frame 124, and formed as a hole with a diameter gradually decreased over a predetermined length section in an inward direction from the surface of the outer frame 124. Further, the inner fastening hole portion 125*b* is connected to the outer fastening hole portion 125*a* and formed to keep a diameter constant after the predetermined length section.

Further, the outer fastening hole portion 125*a* and the inner fastening hole portion 125*b* are provided to form a predetermined diameter not to interfere with the grass passing space while maintaining coupling with the hook fastener 123. The diameter of each of the outer fastening hole portion 125*a* and the inner fastening hole portion 125*b* is smaller than the thickness of the outer frame 124 as shown in FIG. 5(*a*).

Further, the outer fastening hole portion 125*a* and the inner fastening hole portion 125*b* may have elasticity in a radial direction to make it easy to receive the hook fastener 123 when the hook fastener 123 and the fastening hole 125 are coupled.

Further, FIG. 5(*b*) shows that the fastening hole 125 according to the present disclosure has a rectangular cross-section. The fastening hole 125 shown in FIG. 5(*b*) may also have elasticity in an axial direction to make it easy to receive the hook fastener 123 when the hook fastener 123 and the fastening hole 125 are coupled.

As described above with the accompanying drawings, the fastening hole 125 shown in FIG. 5(*a*) is suitable for coupling with the hook fastener 123 shown in FIG. 4(*a*), and the fastening hole 125 shown in FIG. 5(*b*) is suitable for coupling with the hook fastener 123 shown in FIG. 3(*a*) or 3(*b*).

Below, a coupling process between the hook fastener and the fastening hole according to one embodiment of the present disclosure will be described with reference to FIG. 4(*a*) and FIG. 5(*a*).

When the grass protection mat and a neighboring grass protection mat are arranged to be in neighborhood with each other, the hook fastener 123 supported on and coupled to the outer frame 124 of the grass protection mat is inserted in and penetrates the fastening hole 125 of the neighboring grass protection mat.

In the hook fastener 123 having a laterally protruding structure, the head 123*a* is inserted in and hooked to the fastening hole 125. That is, the head 123*a* of the hook fastener 123 protrudes as if it goes laterally and reaches the inner fastening hole portion 125*b* via the outer fastening hole portion 125*a*.

In such a manner that another grass protection mat is additionally arranged to be in the neighborhood, i.e. that the hook fastener 123 of one mat is inserted in and penetrates the fastening hole 125 of another mat so that a plurality of grass protection mats are connected. Thus, the plurality of grass protection mats are coupled by a laterally connecting structure, thereby forming a horizontally extended integrated grass protection mat.

Further, the hook fastener 123 provided between the grass protection mats directly connects the outer frames of the mats and forms a predetermined gap for the contraction-expansion compensation between the mats, thereby minimizing thermal deformation of the mats even though the mats are contracted or expanded after construction, and increasing an efficiency of compensating for the contraction or expansion between the mats.

According to one embodiment of the present disclosure, the hook fastener and the fastening hole are provided in the lateral direction of the grass protection mat, thereby not only facilitating the connection and separation between the grass protection mats but also compensating for the contraction and expansion.

Figure 6A:
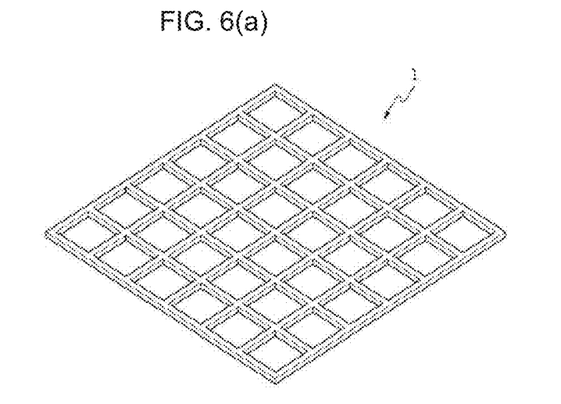
FIGS. 6(a), 6(b) and 6(c) are views of various grass protection mats according to the present disclosure.
Figure 6B:
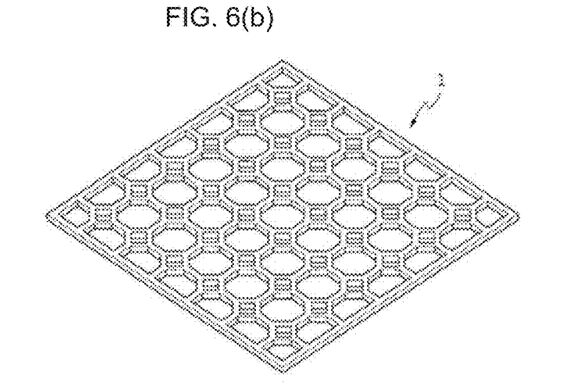
Figure 6C:
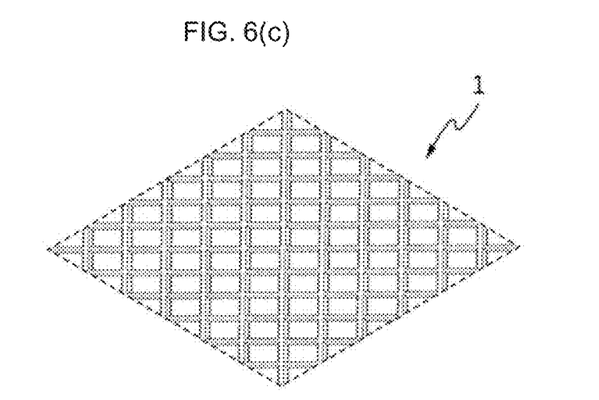

FIGS. 6(*a*) to 6(*c*) are views of various grass protection mats according to the present disclosure.

According to one embodiment of the present disclosure, the grass protection mats 120 having various grass passing spaces may be combined.

FIG. 6(*a*) illustrates that grass passing spaces are continuously connected to form a predetermined pattern through diamond-shaped bodies of the grass protection mat 120, FIG. 6(*b*) illustrates that grass passing spaces are continuously connected to for a predetermined pattern through octagonal bodies, and FIG. 6(*c*) illustrates that grass passing spaces are continuously connected to form a predetermined pattern with quadrangular bodies of the grass protection mat 120.

As described above, in a grass protection mat having an integrated assembly type structure according to the present disclosure, a hook fastener and a corresponding fastening hole, which are provided in a lateral direction of the mat, are used to thereby keep coupling strength between the mats and prevent them from being easily separated by unintentional external force, and facilitate connection and separation work.

Thus, according to the present disclosure, a hook fastener is used as a connecter provided in a plurality of grass protection mats so that the grass protection mats can be easily coupled to or separated from each other, thereby promoting convenience in assembling or disassembling the mats.

In particular, according to the present disclosure, there is provided an integrated assembly type grass protection mat, in which a plurality of hook fasteners and a plurality of corresponding fastening holes, which are provided in outer frames of the grass protection mat, are used to couple and engage the grass protection mats each other and keep high coupling strength between the mats, and thus allows an easiness in coupling with or separating the mats each other while minimizing any inconvenience in control by a user due to the connector itself, thereby improving convenience in control by a user.

Further, according to the present disclosure, the connector placed between the neighboring mat units functions to compensate for contraction and expansion, thereby increasing the contraction-expansion compensation efficiency for the mats. In addition, the connector is formed not to interfere with a space where grass grows, thereby making photosynthesis of the grass active.

Although a few exemplary embodiments of the present disclosure have been shown and described, these are for illustrative purpose only and it will be appreciated by those skilled in the art that changes may be made in these embodiments without departing from the principles and spirit of the invention, the scope of which is defined in the appended claims and their equivalents.

REFERENCE NUMERALS

120: grass protection mat
121: body
123: hook fastener
124: outer frame
125: fastening hole

What is claimed is:

1. A grass protection mat comprising a body where grass passing spaces are continuously arranged and an outer frame comprising four frames formed in four directions to finish an outer edge of the body,
wherein the grass protection mat is characterized by further comprising at least one hook fastener which is provided on a first lateral frame of the outer frame and horizontally protrudes from the first lateral frame of the outer frame and at least one fastening hole which is provided in a second lateral frame of the outer frame,
wherein the at least one fastening hole comprises an outer fastening hole portion having a diameter gradually decreased over a predetermined length section in an inward direction of the second lateral frame of the grass protection mat and an inner fastening hole portion being connected with the outer fastening hole portion and having a diameter kept constant after the predetermined length section,
and wherein the outer fastening hole portion and the inner fastening hole portion have elasticity in a radial direction.

2. The grass protection mat according to claim 1, wherein the first lateral frame and the second lateral frame of the grass protection mat are two frames forming a right angle among the four frames of the outer frame of the grass protection mat.

3. The grass protection mat according to claim 2, wherein the at least one hook fastener is provided on the first lateral frame, and the at least one fastening hole is provided in the second lateral frame.

4. The grass protection mat according to claim 1, wherein each of the at least one hook fastener of the grass protection mat is formed at a respective position to be corresponded to a position of each of at least one fastening hole of a neighboring grass protection mat, and
each of the at least one fastening hole of the grass protection mat is formed at a respective position to be corresponded to a position of each of at least one hook fastener of a second neighboring grass protection mat.

5. The grass protection mat according to claim 1, wherein the at least one hook fastener comprises a fastening support having a predetermined length to form a predetermined gap to compensate for contraction or expansion between the mats.

6. The grass protection mat according to claim 1, wherein the at least one hook fastener or the at least one fastening hole is formed with an elastic member.

7. The grass protection mat according to claim 1, wherein the at least one hook fastener comprises a fastening support horizontally protruding from the first lateral frame of the grass protection mat, and a head formed on one end of the fastening support.

8. The grass protection mat according to claim 7, wherein the head has a shape of cylinder, arrow or H-shape.

* * * * *